United States Patent [19]

Onodera et al.

[11] Patent Number: 4,972,310

[45] Date of Patent: Nov. 20, 1990

[54] SEQUENCE CONTROL SYSTEM AND ITS METHOD

[75] Inventors: Masayuki Onodera, Isehara; Hisashi Kubota, Fujisawa; Tatsuo Naitoh; Takayuki Kawakami, both of Sagamihara; Takatoshi Itoh; Kei Shimizu, both of Zama, all of Japan

[73] Assignee: Nissan Motor Company, Limited, Yokohama, Japan

[21] Appl. No.: 306,580

[22] Filed: Feb. 6, 1989

[30] Foreign Application Priority Data

Feb. 5, 1988 [JP] Japan .................................. 63-23793
Feb. 5, 1988 [JP] Japan ............................. 63-13516[U]

[51] Int. Cl.$^5$ ........................................... G05B 11/01
[52] U.S. Cl. .................................. 364/140; 364/474.02
[58] Field of Search .............. 364/140, 141, 146, 147, 364/436, 900, 949, 926.9, 474.02, 474.01

[56] References Cited

U.S. PATENT DOCUMENTS

4,486,830 1/1984 Taylor, Jr. et al. .................. 364/141
4,799,141 1/1989 Drusinsky et al. .................... 364/141

*Primary Examiner*—Jerry Smith
*Assistant Examiner*—Paul Gordon
*Attorney, Agent, or Firm*—Foley & Lardner, Schwartz, Jeffery, Schwaab, Mack, Blumenthal & Evans

[57] ABSTRACT

To facilitate program control modification and troubleshooting in sequence control system in spite of simple processing programs, sequence control processes are linked in a chain fashion. A unit process for activating an actuation member in both forward and reverse directions forms a ring so as to be activated in sequence cyclically via an execution condition recognizing switches, and these unit process rings are linked between an actuation start side activator for the present process and an actuation end side activator for the preceding process, both activated simultaneously whenever one of them is activated. Therefore, any process can be stopped at, restarted and reversed from any process steps in both the forward and reverse directions through the linked actuation start and end side activators, after the automatic operation has been switched to the manual operation or vice versa. Further, when a plurality of machines are controlled by a single sequencer, it is preferable to selectively connect a single operation board to a necessary robot connector to minimize the robot space and the cost.

4 Claims, 10 Drawing Sheets

FIG.1 (A)
Prior Art

① LIFTER: UP

② CLAMP1: ON
CLAMP2: ON

③ IF WORK A;PROCESS A: FORWARD
IF WORK B;PROCESS B: FORWARD

④ PROCESS A,B: REVERSE

⑤ CLAMP1: AWAY
CLAMP2: AWAY

⑥ LIFTER: DOWN

SEQUENCE CONTROL SYSTEM AND ITS METHOD

BACKGROUND OF THE INVENTION

1. Field of the Invention

The present invention relates generally to a sequence control system and its method of controlling sequential operation of machine tools, for instance and more specifically to a sequence control system and its method which can facilitate operation modification and trouble repair, in particular.

Further, the present invention is closely related to another copending application filed title on Oct. 31, 1988 by the same applicant and inventors. The present invention is an improvement of the above-mentioned copending application.

2. Description of the Prior Art

Recently, programmable sequence control systems have been widely adopted to control various industrial machines in various industrial fields. The reason why these sequence control systems have come into wide use is that any required system can be configured by forming user programs; machine operations can be simply modified to required motions by changing only programs; and further the system cost is relatively low.

In the sequence control system as described above, however, since the processing method is of the relay ladder method, when adopted to a very large-scale industrial machine, there exist problems in that the programs for the sequence control system for controlling the industrial machine is huge and complicated and further it takes great amounts of time whenever the programs are modified. For example, when some member becomes unmovable, conditions under which the member is moved is checked in sequence on the basis of ladder diagrams. However, if the conditions are huge, it takes much time to check and find out the causes of the trouble. This is because it is impossible to understand the operation only by looking at the ladder diagrams.

To overcome the above-mentioned drawbacks involved in the relay ladder method, recently sequence control systems of the graph set processing method have been adopted. In the sequence control systems of the graph set method, since processing steps can be entered in correspondence to the machine operation, when the machines are modified or repaired, the processing steps stored in the sequence control system are outputted to an understand machine operation, with reference to the outputted processing steps. Therefore, it is possible to repair or modify the machines more easily as compared with those of relay ladder method.

Figure 1:
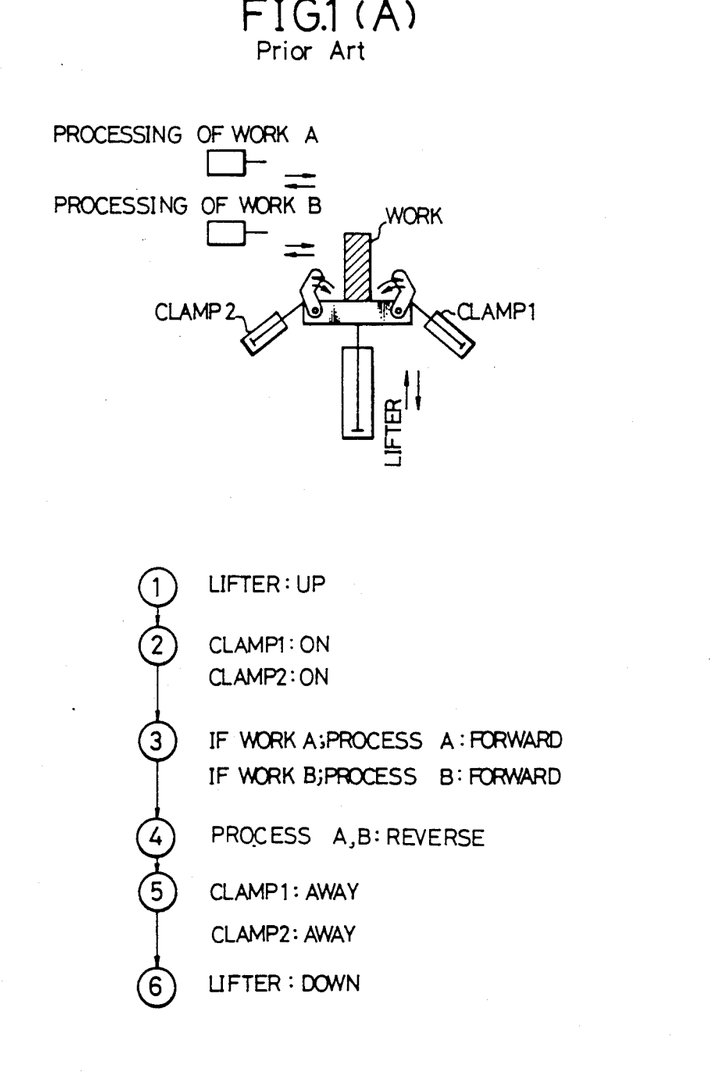
FIG. 1(A) is an illustration for assistance in explaining a simple prior art machine operation.
FIG. 1(B) is a timing chart for assistance in explaining a prior-art graph-set sequence control system for controlling the machine shown in FIG. 1(A)
FIG. 1(C) is a flowchart for explaining the operation of the machine shown in FIG. 1(A) in accordance with a timing chart shown in FIG. 1(B)
FIG. 1(D) is a block diagram showing a prior-art sequence control system for controlling a plurality of machines (e.g. robots)
Figure 1B:
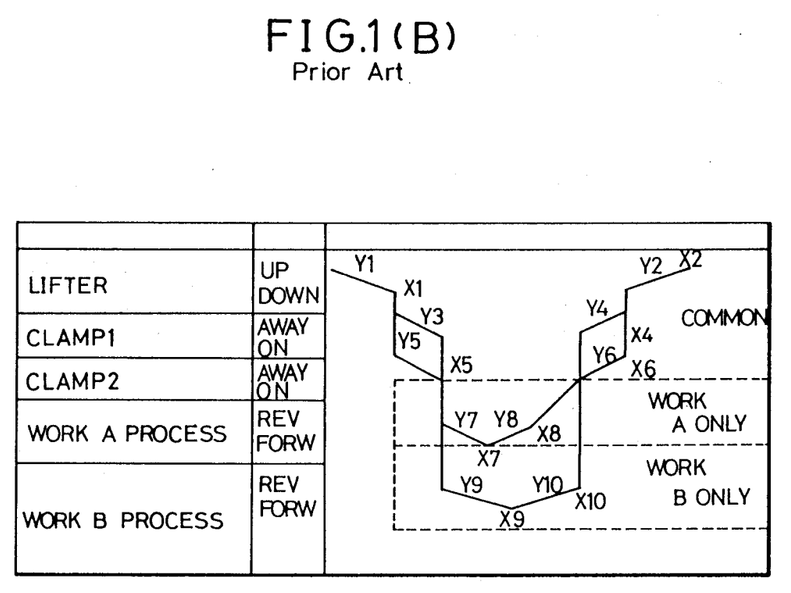
Figure 1C:
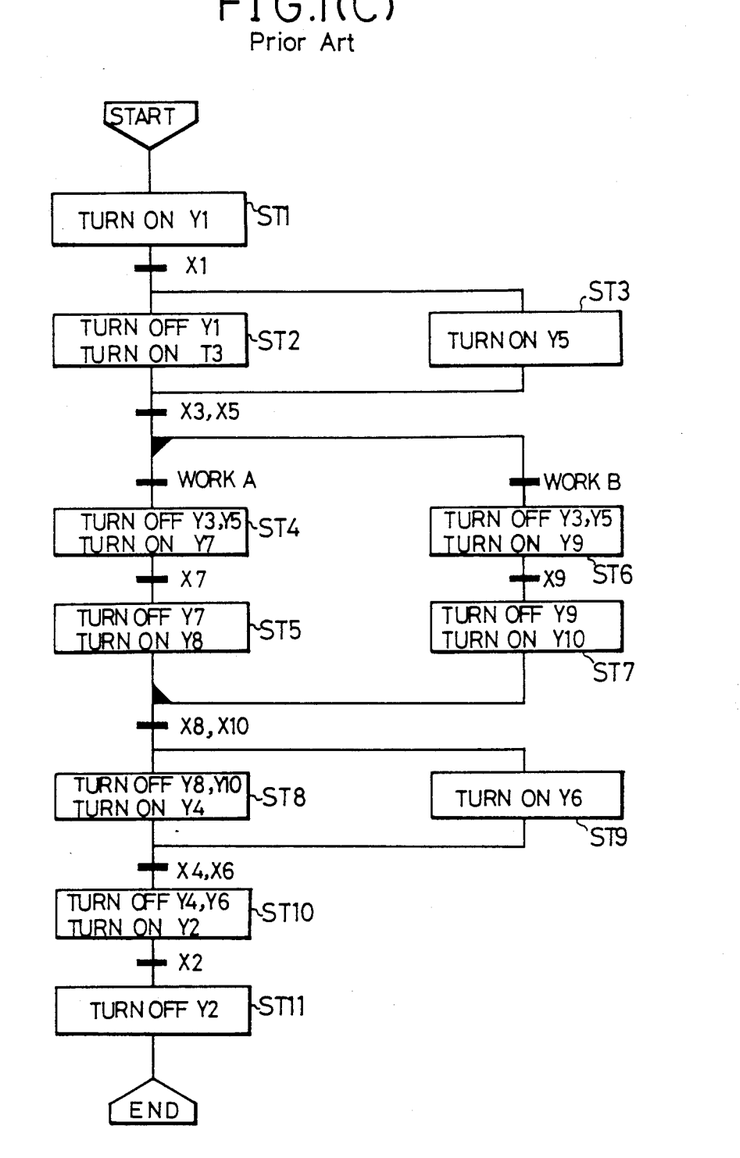

For instance, when a machine which functions as shown in FIG. 1(A) is controlled by a sequence control system of the graph set method, first, a timing chart as shown, in FIG. 1(B) is formed, and processing steps as shown in FIG. 1(C) are inputted in correspondence to the timing chart.

That is, first Y1 is turned on to raise a lifter (in step 1). If the lifter is raised to an upper limit and therefore a transition condition X1 is on, Y1 is turned off and Y3 is turned on and simultaneously Y5 is turned on to move clamps 1 and 2 (in steps 2 and 3). Succeedingly, transition conditions X3 and X5 are turned on, and therefore transition conditions X3 and X5 are turned on, and therefore transition conditions of workpiece A is turned on; that is, when the clamps 1 and 2 move to the forward end and also the workpiece is A, Y3 and Y5 are turned off simultaneously and Y7 is turned on (in step 4). When the workpiece A is processed in a predetermined process and therefore transition conditions X7 is turned on, Y7 is turned off and Y8 is turned on (in step 5). On the other hand, when conditions X3 and X5 are turned on and further transition condition of workpiece B is turned on; that is, when the clamps 1 and 2 move to a forward end and the workpiece is B, Y3 and Y5 are turned off simultaneously and Y9 is turned on (in step 6). When the workpiece B is processed and therefore the transition condition X9 is turned on, Y9 is turned off and Y10 is turned on (in step 7). Thereafter, when the workpiece A or B has been processed and therefore the transition conditions X8 and X10 are turned on, Y8 and Y10 are turned off and Y4 is turned on and simultaneously Y6 is turned on to return the clamps 1 and 2 (in steps 8 and 9). Further, when the clamps 1 and 2 are returned and therefore transition conditions X4 and X6 are turned on, Y4 and Y6 are turned off and Y2 is turned on to lower the lifter (in step 10). When the lifter is lowered to a lower limit and therefore transition condition X2 is turned on, Y2 is turned off (in step 11).

As described above, in the sequence control system of graph set method, since it is possible to directly input processing steps on the basis of the timing chart as shown in FIG. 1(B), the system can be modified or repaired relatively simply.

In the sequence control system of graph set method as described above, although there are many advantages as long as the machine is controlled automatically, in case trouble occurs with the machine and therefore some members are required to be moved manually, various problems develop.

For instance, in the flowchart shown in FIG. 1(C), in case the lifter will not rise to an upper limit due to some trouble, the step 1 is kept forever. Since it is impossible to repair the machine under these conditions, a step for forcedly stopping this processing is additionally required. In other words, it is necessary to switch the automatic operation to the manual operation to move the lifter manually. However, if the flowchart is previously formed together with the manual operation under consideration of trouble, since the manual operation flowchart must be added for each process, the flowcharts for covering the entire operation are very complicated, and therefore there exists a problem in that the advantages of graph set method cannot be utilized in practice.

Further, even if elements of the machine can be moved by the above-mentioned manual operation, it is impossible to restart the machine by simply switching the manual operation to the automatic operation after repair or adjustment. This is because machine elements are kept stopped at positions determined when the automatic operation has been switched to the manual operation.

SUMMARY OF THE INVENTION

With these problems in mind, therefore, it is the primary object of the present invention to provide a sequence control system and method by which control operation can be modified simply and further trouble can be repaired also simply, in spite of simple processing programs.

To achieve the above-mentioned object, a sequence control system for controlling a plurality of processes in sequence, each process being achieved by actuating an actuation member in both forward and reverse directions, according to the present invention, comprises: (a) forward side executing means for executing a forward process by driving at least one actuation member in the forward direction; (b) forward side actuating means for determining whether said forward side executing means is ready for execution; (c) forward side stopping means for stopping said forward side executing means; (d) reverse side executing means for executing a reverse process by driving the at least one actuation member in the reverse direction; (e) reverse side actuating means for determining whether said reverse side executing means is ready for execution; (f) reverse side stopping means for stopping said reverse side executing means; (g) actuation start side activating means, coupled to said forward side actuating means and said reverse side stopping means and activated when said reverse side stopping means is turned on, for allowing said forward side executing means to be ready for execution when said forward side actuating means is turned on; (h) actuation end side activating means, coupled to said forward side stopping means and said reverse side actuating means and activated when said forward side stopping means is turned on, for allowing said reverse side executing means to be ready for execution when said reverse side actuating means is turned on, said actuation start side activating means for the present process and said actuation end side activating means for the preceding process being activated simultaneously when one of both is activated; and (i) execution condition recognizing means, coupled to said forward side actuating means and said reverse side actuating means, for recognizing a forward side executable condition under which said forward side execution means can be executed when said forward side actuating means determines that said forward side executing means is ready for execution and a reverse side executable condition under which said reverse side execution means can be executed when said reverse side actuating means determines that said reverse side executing means is ready for execution.

Further, to achieve the above-mentioned object, a sequence control method, according to the present invention, comprises the steps of: (a) checking whether actuation start side activating means (P1) for the present process is activated; (b) if activated, activating actuation end side activating means (P0) for the preceding process; (c) checking again whether the actuation start side activating means (P1) for the present process is activated; (d) if not activated, ending control; (e) if activated, checking whether forward side executing means is ready for execution (S1=1?); (f) if not ready for execution, repeating the above steps (c) to (e); (g) if ready for execution, deactivating actuation end side activating means (P0) for the preceding process; (h) deactivating the actuation start side activating means (P1) for the present process; (i) checking whether an execution condition under which forward side executing means can be executed is recognized (H1=1?): (j) if an execution condition is recognized, executing forward side executing means (J1); (k) if an execution condition is not recognized or the forward side executing means (J1) is executed; (l) checking whether the forward side executing mean can be stopped (S2=1?); (m) if cannot be stopped, repeating the above steps (i) to (k); and (n) if can be stopped, activating actuation end side activating means (P2) for the present process and actuation start side activating means (P3) for the succeeding process, simultaneously.

In the sequence control system according to the present invention, a number of sequential control processes are linked in a chain fashion. A unit process for activating an actuation member in both forward and reverse directions forms a ring so as to be activated in sequence cyclically only after one of execution condition recognizing switch has been turned on, and these unit process rings are linked between the actuation start side activating means for the present process and the activation end side activating means for the preceding process (which are both activated simultaneously whenever one of them is activated). Therefore, it is possible to stop, restart or reverse any process steps in both the forward and reverse directions through the linked actuation start and end side activating means, after the automatic operation has been switched to the manual operation or vice versa.

In practice, when a preceding process has been completed (e.g. a workpiece is lifted by a lifter), the actuation end side activating means for the preceding process (e.g., a relay switch) and the actuation start side activating means for the present process (e.g., a relay switch) are both activated. Under these conditions, when the forward side actuating means (e.g. relay switch) is turned on to indicate readiness ready for the execution of the forward side executing means, the forward side execution means (e.g. valve to drive a cylinder) is activated to execute a predetermined process (e.g. the lifted workpiece is clamped only after the execution condition recognizing means (e.g. a switch) has been turned on. When the forward side stopping means (e.g. a limit switch) is turned on, the forward side execution means is deactivated and the actuation end side activating means (e.g. a relay switch) is activated for standing-by the succeeding process (e.g. the clamped workpiece is processed).

In case of trouble, when the reverse side actuating means (e.g. a push-button switch) is turned on to indicate the ready for the execution of the reverse side executing means, the reverse side execution means (e.g. a valve to reverse the cylinder) is activated only after the execution condition recognizing means (e.g. switch) has been turned on. When the reverse side stopping means (e.g. limit switch) is turned on, the reverse side execution means is deactivated (e.g. the clamped workpiece is released) and the actuation start side activating means (e.g. relay switch) is activated. Simultaneously, since the actuation end side activating means (e.g. relay switch) for the preceding process is also activated, it is possible to further reverse the process. (e.g. the workpiece can be lowered by the lifter) where necessary.

DETAILED DESCRIPTION OF THE PREFERRED EMBODIMENTS

Embodiments of the sequence control system and its method according to the present invention will be described hereinbelow with reference to the attached drawings.

Figure 2:
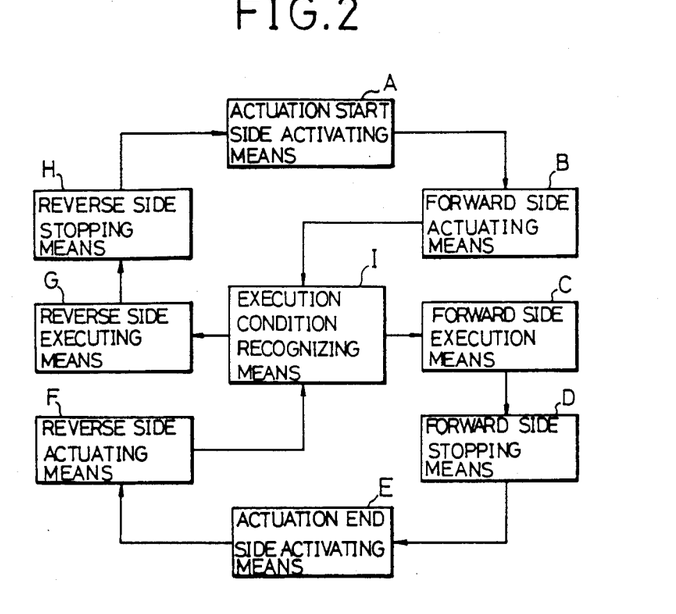
FIG. 2 is a basic conceptual block diagram showing a sequence control system of the present invention.

FIG. 2 is a conceptual diagram of the system of the present invention, which comprises: (a) forward side executing means C for executing a forward process by driving at least one actuation member in the forward direction; (b) forward side actuating means B for determining whether said forward side executing means is ready for execution; (c) forward side stopping means D for stopping said forward side executing means; (d) reverse side executing means G for executing a reverse process by driving the at least one actuation member in the reverse direction; (e) reverse side actuating means F for determining whether said reverse side executing is ready for execution; (f) reverse side stopping means H for stopping said reverse side executing means; (g) actuation start side activating means A, coupled to said forward side actuating means and said reverse side stopping means and activated when said reverse side stopping means is turned on, for allowing said forward side executing means to be ready for execution when said forward side actuating means is turned on; and (h) actuation end side activating means E, coupled to said forward side stopping means and said reverse side actuating means and activated when said forward side stopping means is turned on, for allowing said reverse side executing means to be ready for execution when said reverse side actuating means is turned on, said actuation start side activating means for the present process and said actuation end side activating means for the preceding process being activated simultaneously when one of both is activated; and (i) execution condition recognizing means (I), execution condition recognizing means, coupled to said forward side actuating means and said reverse side actuating means, for recognizing a forward side executable condition under which said forward side execution means can be executed when said forward side actuating means determines that said forward side executing means is ready for execution and a reverse side executable condition under which said reverse side execution means can be executed when said reverse side actuating means determines that said reverse side executing means is ready for execution.

When the sequence control system is operated by the method as described above, the system operated as follows:

With reference to FIG. 2, when the actuation start side activating means A is activated and the forward side actuating means B is turned on, the actuation start side activating means A is deactivated, and further when the execution condition recognition means I determines that execution conditions are satisfied, the forward side executing means C operates an actuation member in the forward stepping direction in a predetermined sequence. Succeedingly, when the forward side stopping means D is turned on, the actuation end side activating means E is activated and simultaneously the actuation start side activating means A at the succeeding step is activated. Under these conditions, when the reverse side actuating means F is turned on, the actuation end side activating means E is deactivated and further when the execution condition recognizing means I determines that execution conditions are satisfied it is possible to operate an operating member in a direction opposite to the forward stepping direction in a predetermined sequence by the reverse side executing means G. Further, when the reverse side stopping means H is turned on, the actuation start side activating means A is activated and further the actuation end side activating means E at the preceding process is activated.

Therefore, the operating member can be operated in the forward stepping direction or the opposite direction for each step in such an intermittent operation as inching operation. Further, even when the manual operation is switched to automatic operation, it is possible to automatically actuate the actuation member. Further, since the processing step program can be simplified, it is possible to quickly modify the machining work and repair trouble.

Embodiments of the sequence control system of the present invention will be described in detail with reference to the attached drawings.

Figure 3:
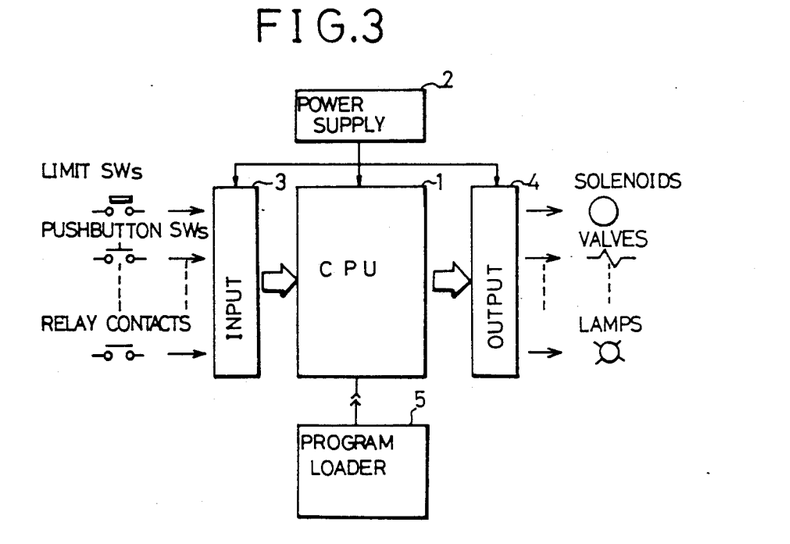
FIG. 3 is a block diagram showing the sequence control system of the present invention.

FIG. 3 is a block diagram of a sequence control system of sequence control method related to the present invention.

In FIG. 3, a power supply section 2, an input section 3 and an output section 4 are connected to a CPU 1 provided with a calculation control section and a memory section. To this input section 3, various switches such as limit switches, push bottom switches, relay contacts are connected to enter various contact information. To the output section 4, electromagnetic switches, electromagnetic valves, pilot lamps are connected to activate these devices in accordance with instructions for the CPU 1.

A program loader 5 for inputting programs in connected to the CPU 1 where necessary. Therefore, when a new program is entered into the CPU 1 or modified, the program is added or modified through this program loader 5.

Figure 4:
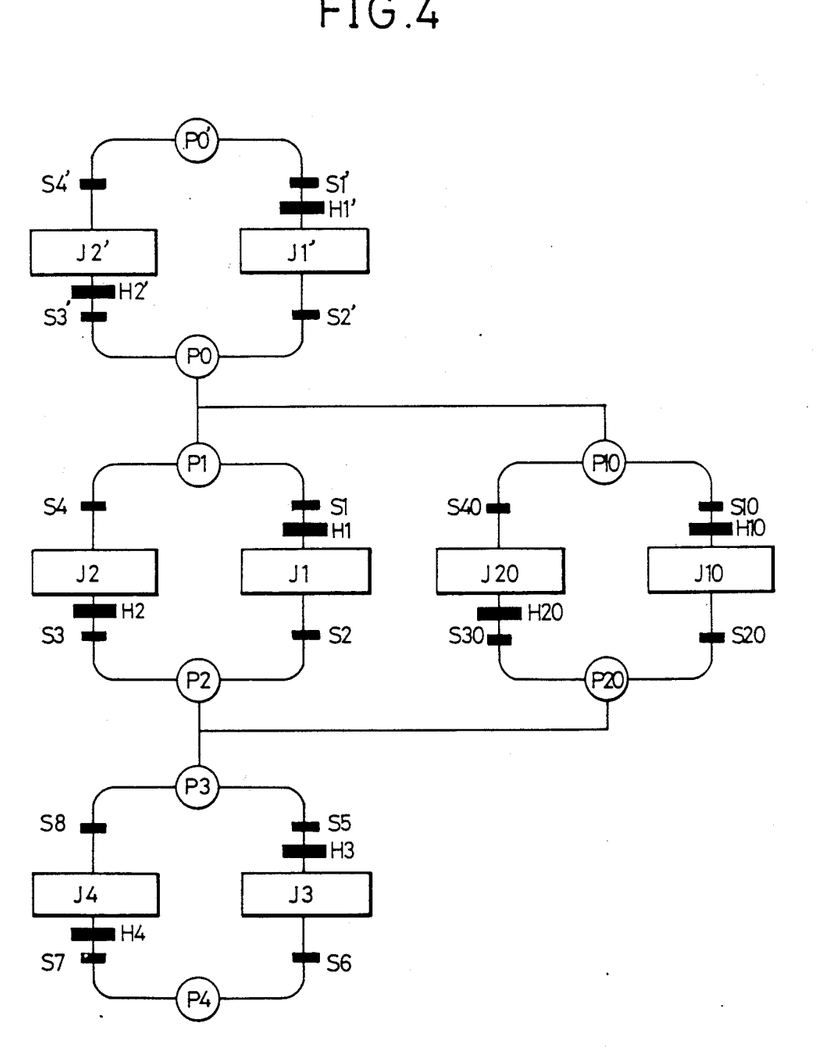
FIG. 4(A) is a conceptual diagram showing some processing examples of the sequence control method of the present invention.
Figure 5A:
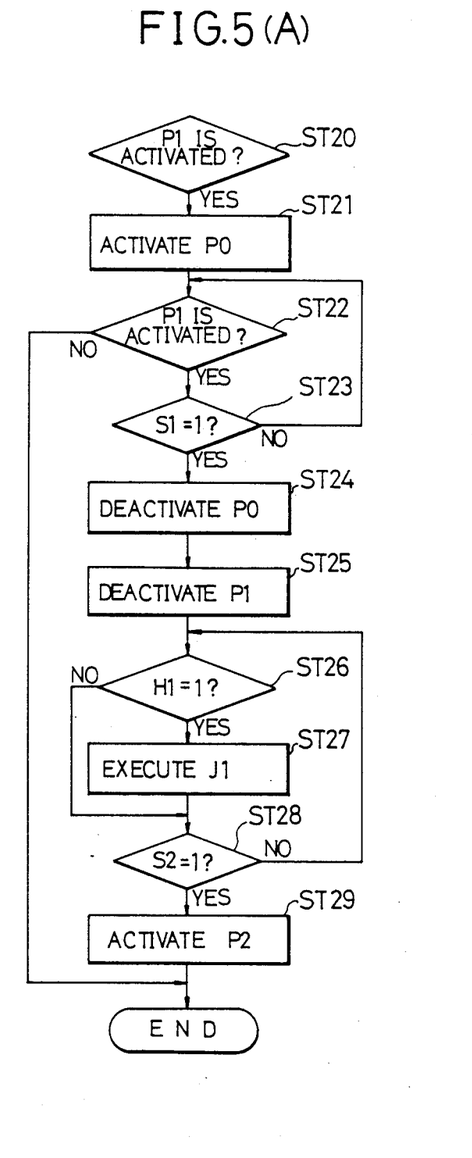
FIGS. 5(A) and (B) are flowcharts for assistance in explaining the basic operation of the sequence control method of the present invention.
Figure 5B:
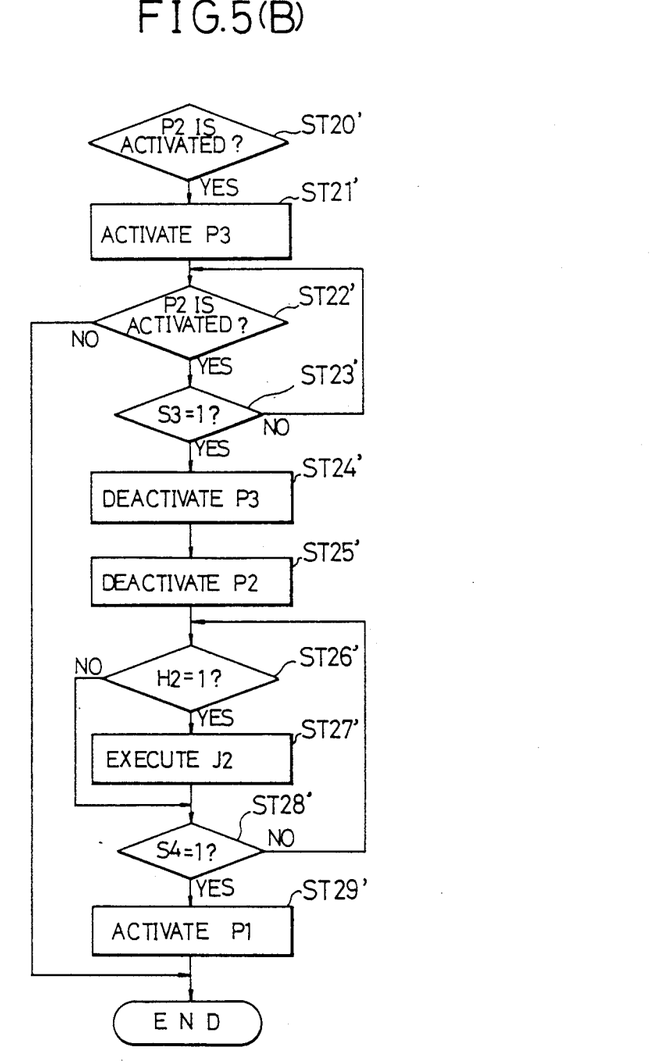

FIG. 4 is a conceptual diagram showing a machine processing method operated as shown in FIGS. 5(A) and (B) in the sequence control system based upon a sequence control method related to the present invention.

In these conceptual diagrams of the processing method, P0', P1, P3 and P10 denote state points of the actuation start side activating means; P0, P2, P4 and P20 denote state points of the actuation end side activating means; S1', S1, S5 and S10 denote transition conditions of the forward side actuating means; S2', S2, S6 and S20 denote transition conditions of the forward side stopping means; S3', S3, S7 and S30 denote transition conditions of the reverse side actuating means; S4', S4, S8 and S40 denote transition conditions of the reverse side stopping means; J1', J1, J3, and J10 denote execution instruction group of the forward side executing means; J2', J2, J4 and J20 denote execution instruction group of the reverse side executing means; and H1', H2', H1, H2, H3, H4, H10 and H20 denote execution conditions determined by the execution condition recognizing means.

Each system element shown in the conceptual diagram of FIG. 4 operates on the basis of the flowchart indicative of the basic operation and shown in FIGS. 5(A) and (B) as follows:

With reference to FIG. 5(A), when the CPU for controlling the whole operation of the sequence control system determines that the state point P1 is active (in step 20), CPU activates the state point P0 (in step 21). CPU determines whether the state point P1 is activated again (in step 22). If not active, control ends; if active, CPU determines whether the transition condition S1 is 1; that is, CPU checks whether an execution instruction group J1 is ready for execution (in step 23). If S1 is not 1, CPU repeats the processes of steps 22 and 23; if S1 is 1, CPU deactivates the state points P0 and P1 to execute the succeeding steps (in steps 24 and 25). Then, CPU determines whether the execution condition H1 is 1, that is, CPU determines whether the conditions under which the execution instruction group J1 can be executed is recognized (in step 26). If the execution condition H1 is 1 on the basis of the determined result, CPU proceeds to the succeeding step to execute the execution instruction group J1 (in step 27). If H1 is not 1, the CPU proceeds to the step 28 without executing the execution instruction group J1. In other words, the execution instruction group J1 is executed only when the transition condition S1 is 1 and further the execution condition condition H1 is 1. Thereafter, CPU determines whether the transition condition S2 is 1; that is, the condition under which an execution instruction group J1 can be ended is satisfied (in step 28). If S2 is not 1, CPU repeats steps from 26 to 28. However, if H1 is 1, CPU continuously executes the execution instruction group J1. Further, if the transition condition S2 is 1, CPU activates the state point P2 (in step 29) to complete the process.

With reference to FIG. 5(B), when the CPU for controlling the whole operation of the sequence control system determines that the end point P2 is active (in step 20'), CPU activates the end point P3 (in step 21'). CPU determines whether the end point P2 is active again (in step 22'). If not active, control ends; if active, CPU determines whether the transition condition S3 is 1; that is, CPU checks whether an execution instruction group J2 is ready for execution for execution (in step 23'). If S3 is not 1, CPU repeats the processes of steps 22' and 23'; if S3 is 1, CPU deactivates the state points P3 and P2 to execute the succeeding steps (in steps 24' and 25'). Then, CPU determines whether the execution condition H2 is 1, that is, CPU determines whether the conditions under which the execution instruction group J2 can be executed is recognized (in step 26'). If the execution condition H2 is 1 on the basis of the determined result, CPU proceeds to the succeeding step to execute the execution instruction group J2 (in step 27'). If H2 is not 1, the CPU proceeds to step 28' without executing the execution instruction group J2. In other words, the execution instruction group J2 is executed only when the transition condition S3 is 1 and further the execution condition H2 is 1. Thereafter, CPU determines whether the transition condition S4 is 1; that is, the condition under which an execution instruction group J2 can be ended is satisfied (in step 28'). If S4 is not 1, CPU repeats steps from 26' to 28'. However, if H2 is 1, CPU continuously executes the execution instruction group J2. Further, if the transition condition S4 is 1, CPU activates the state point P1 (in step 29') to complete the process.

As described above, each construction element shown in the conceptual diagram of FIG. 4 operates in the above-mentioned manner. Further, other construction elements shown in FIG. 4 operate in quite the same ways. Therefore, the description of the operations of these other elements is omitted herein.

The conceptual operation of the above-mentioned construction elements will be explained hereinbelow with respect to the operation of the actual mechanical construction members shown in FIGS. 1(A) and (B), by way of example, in which only the operation of the clamps 1 and 2 shown in FIG. 1(A) will be explained.

First, under the condition that the lifter reaches the upper limit and therefore the transition condition S3' is not established (i.e. the condition that the lifter is moved manually from the upper limit to the lower limit is not satisfied), the state point P1 is activated and simultaneously the state point P10 is activated. However, when the transition condition S1 and the execution condition H1 are both satisfied, the execution instruction group J1 is executed to move out the clamp 1. In the same way, when the transition condition S10 and the execution condition H10 are both satisfied, the execution instruction group J10 is executed to move out the clamp 2. Thereafter, CPU determines that the transition conditions S2 and S20 are both 1; that is, whether the condition that the execution instruction groups J1 and J10 can be ended is satisfied (i.e. whether the clamps 1 and 2 move to the upper limits). As a result of the determination, if the transition conditions S2 and S20 are not 1, respectively, CPU continues to execute the execution instruction groups J1 and J10. In other words, the clamps 1 and 2 are kept moved to the upper limits. When the transition conditions S2 and s20 are both 1, that is, the clamps 1 and 2 have moved to the upper limits, CPU activates the state points P2 and P20 to complete the process. Thereafter, CPU determines whether the transition conditions S3 and S30 are activated, respectively (i.e. manual switches are turned on) and further the condition that the execution instruction group J2 can be executed (i.e. the clmaps 1 and 2 can be moved to the lower limits) are satisfied. Where the execution condition is established under these states (i.e. a manual push button switch for moving the clamps 1 or 2 from the upper limit to the lower limit is turned on), as far as the execution condition H2 is established, the clamp 1 is moved from the upper limit to the lower limit, or as far as the execution condition H20 is established, the clamp 2 is moved from the upper limit to the lower limit. That is, the clamp 1 or 2 operates only when the push button switch for moving the clamp 1 or 2 from the upper limit to the lower limit is turned on. Thereafter, CPU determines whether transition conditions S4 or S40 is 1; that is whether the condition that the execution of the execution instruction group J2 or J20 can be ended is satisfied. If satisfied, CPU activates the state point P0 to complete the process.

As described above, since the execution instruction group which executed automatically and the execution instruction group which is executed only when the manual operation is selected are both provided, even if the machine stops during automatic operation due to some trouble, the control system can freely move the construction elements of the machine by switching the automatic operation to the manual operation to remove the trouble causes. After the trouble causes have been removed or repaired, since the machine can be switched from the manual operation to the automatic operation, it is possible to operate the machine automatically from the position at which trouble develops.

Further, in the above-mentioned embodiment, the processing contents of the reverse side execution instruction group is opposite in operation to those of the forward since execution instruction group. Without being limits thereto, it is also possible to apply the present invention to the process where the processing contents which are the same and opposite to the forward side execution instruction group are simultaneously provided in parallel to each other.

As described above, in a sequence control system or method of the present invention, a unit process for activating an actuation member in both forward and reverse directions forms a ring so as to be activated in sequence cyclically, and these unit process rings are linked between an actuation start side activator for the present process and an actuation end side activator for the preceding process so as to be activated simultaneously when one of them is activated. In addition, the forward or reverse side execution means C or G can be executed only when the forward or reverse side actuating means B or F determines that the execution means C or G is ready for execution and further when the execution condition recognizing means I recognizes a forward or reverse side executable condition.

Therefore, the operating member can be operated in intermittent manner in the forward stepping direction or the opposite direction step by step. Further, even when the manual operation is switched to the automatic operation, it is possible to automatically actuate the actuation member. Further, since the processing step program can be simplified as a simple block for each step, it is possible to simplify the program input processing and quickly modify the machining work and repair trouble.

Figure 6A:
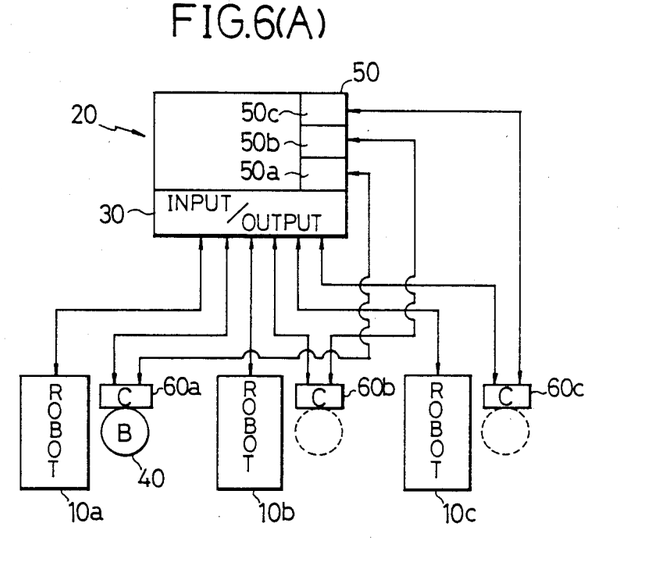
FIG. 6(A) is a block diagram showing a sequence control system and its peripheral units for assistance in explaining the present invention.

In the above description, a sequence control system for sequentially controlling a single machine has been explained. In this case, the control system as shown in FIG. 6 can be adopted.

Usually, however, a plurality of machines are controlled by a single sequencer.

Figure 1D:
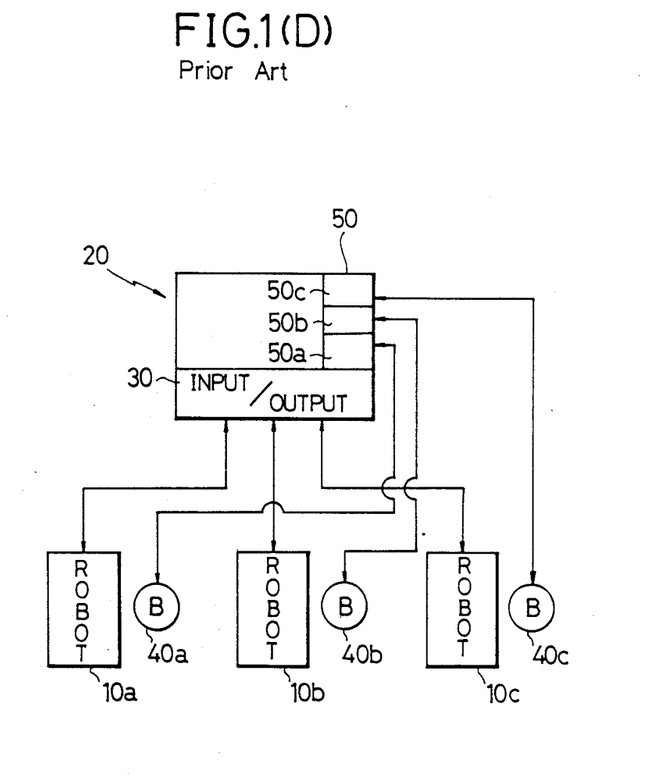

FIG. 1(D) shows an example of prior-art sequencers for sequentially controlling plural robots.

In FIG. 6, three robots 10a, 10b and 10c for performing work are arranged at each processing and assembling work stage in a manufacturing factory. These robots 10a, 10b and 10c are connected to an input/output device 30 of a sequencer 20 for controlling the entire operations of these robots. Further, three operation boards 40a, 40b and 40c for generating operation commands to each of the robots 10a, 10b and 10c are disposed near these robots. These operation boards 40a, 40b and 40c are connected to communication ports 50a, 50b and 50c of the sequencer 20 to execute robot operations on the basis of operation commands generated from these operation boards 40a, 40b and 40c. For instance, when an operator wants to operate the robot 10a manually, an operation switch on the operation board 40a is set to a manual position. The operation command from this operation switch is inputted to the sequencer via the communication port 50a, so that the sequencer 20 sets the operation of the robot 10a to a manual mode on the basis of the operation command to operate the robot 10a via the input/output device 30 on the basis of the operation command applied from the operation board 40a via the communication port 50a. The other robots 10b and 10c are operated in the same way; that is, operation commands are generated from the operation boards 40b and 40c to control robot operations.

In the prior-art sequencer as described above, however, since the operation board for generating each operation command to each robot is provided for each robot and connected to the sequencer and further specific addresses are preset at each communication port to which the operation board is connected, the operation of each robot must be performed by use of each operation board corresponding to each robot. Therefore, for instance, there exists a problem in that it is impossible to improve these operation boards to a simple, portable board usable in common for each robot so that the board can be used near a robot required to be operated.

In other words, it has been necessary to provide an operation board for each robot, in spite of the fact that these operation boards are not used so often, thus increasing the installation space and the cost thereof.

Therefore, it is preferable to provide a sequence control system for enabling communications with the sequencer by connecting a common operation board connected to one of plural connectors connected to the communication ports of the sequencer.

An embodiment of a sequencer according to the present invention will be explained in detail with reference to the attached drawings.

FIG. 6(A) is diagram showing a connecting state between the sequence control system related to the present invention and peripheral units.

As shown in the drawing, robots 10a, 10b and 10c of controlled machines are arranged at each stage of a production line, and connected to a sequencer 20 for controlling the entire operations of these robots via an input/output section 30 serving as communicating means. These robots are operated on the basis of programs stored in the sequencer 20.

Further, connectors 60a, 60b and 60c serving as connecting means are connected to the input/output device 30 and communicating devices 50 serving as the communication enabling means of the sequencer 20. Further, an operation board 40 serving as operation commanding means for outputting each operation command to each robot is connected to the connectors 60a, 60b and 60c.

Figure 6B:
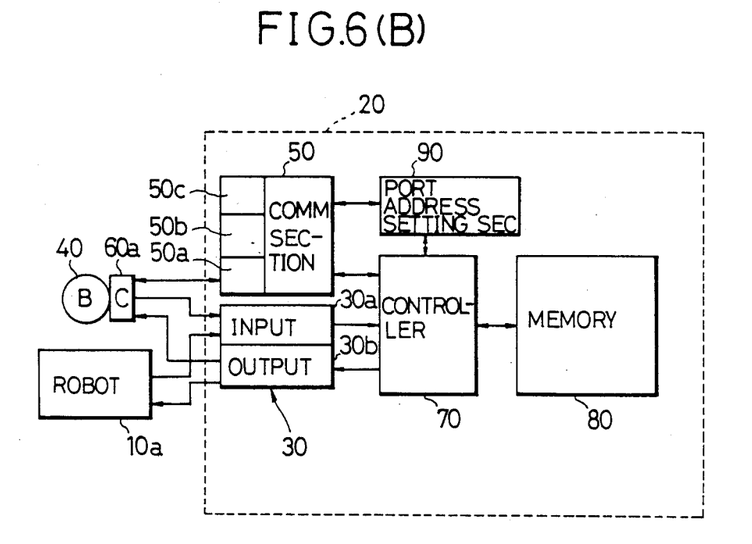
FIG. 6(B) is a block diagram showing an internal system configuration of the sequence control system shown in FIG. 6A.

FIG. 6(B) is a schematic block diagram showing an internal configuration of the sequencer 20. In the drawing, a control section 70 controls the entire operations of robots connected to the sequencer 20. To this control section 70, there are connected an input section 30a and the output section 30b constructing an input/output section 30. Further, a robot 10a and a connector 60a (to which an operation board 40 is connected) are connected to these input and output sections 30a and 30b. A memory section 80 for storing operation programs for the robot 10a is connected to the control section 70. Therefore, the control section 70 operates the robot 10a in accordance with operation programs stored in a memory section 80 and via the input and output sections 30a and 30b. Further, a communication section 50 and a port address setting section 90 are connected to the control section 70. A connector 60a is connected to a communication port 50a of the communication section 50.

Figure 6C:
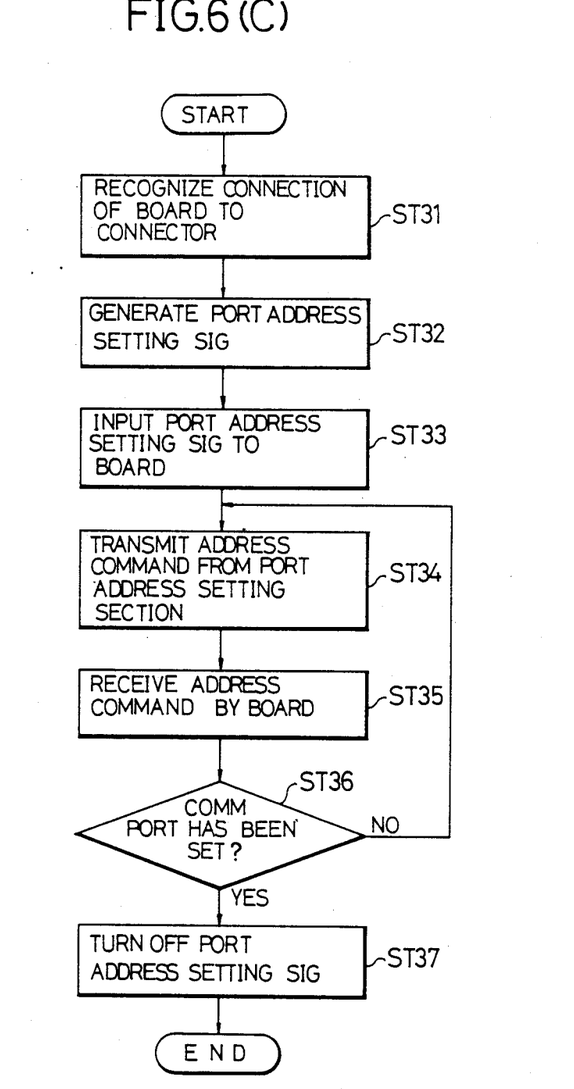
FIG. 6(C) is a flowchart for assistance in explaining the operation of the sequence control system shown in FIGS. 6(A) and 6(B).

The operation of the sequence control system of the present invention thus constructed will be described hereinbelow with reference to the operation flowchart shown in FIG. 6(c).

First, when the operation board 40 is connected to the connector 60a, information indicative of the connection of the operation board 40 is inputted to the control section 70 via the input section 30. Therefore, the control section 70 recognizes that the operation board 40 is connected to one of the connectors (in step 31). Thereafter, the control section 70 outputs a port address setting signal from the output section 30b to the board 40 in order to enable communications between the connected operation board 40 and the control section 70 (in step 32) and simultaneously allows the port address setting section 90 (for determining a communication port in the communication section 50) to set a communication port (in step 33). Therefore, the port address setting section 90 outputs an address command from the communication section 50 (in step 34), and the operation board 40 receives this outputted address commands (in step 35). Under these conditions, the port address setting section 90 receives a signal outputted from the operation board 40 via the connector 60a and the communication port 50a in order to determine the communication port 50a. The control section 70 determines whether the communication port 50a has been set. If not yet determined, the above steps 34 to 36 are repeatedly executed. If determined (in step 36), control proceeds to the succeeding step 37. In the above step 36, when the communication port 50a is determined by the port address setting section 90 (in step 36), an end signal indicative of communication port setting is outputted from the port address setting section 90 to the control section 70, so that the control section 70 turns off the port address setting signal in response to this end signal (in step 37).

As described above, whenever the operation board is connected to one of the plural connectors connected to the sequence control system, the sequence control system automatically determines an input/output section and a port of the communication section so that operation commands can be inputted from the operation board via the connector now being connected. For instance, when trouble develops in a robot and therefore the robot must be operated manually, the portable and common operation board is carried to the robot now in trouble by a repair man, and then the operation board is set to a connector disposed near the robot so that the robot can be moved manually. Therefore, it is unnecessary to provide each operation board (not used so frequently) for each robot, thus permitting an effective use of the installation space and reducing the installation cost.

Further, is the above embodiment, robots are shown as controlled machines by way of example. Without being limited, however, it is of course possible to apply the present invention to machine tools.

As described above, in the sequence of the present invention, when the operation commanding means (e.g. operation board 40) is first connected to one of the connecting means (e.g. connector 60), the communication enabling means (e.g. communication section 50) enables information communications between the communication enabling means 50 and the operation commanding means 40 via the connected connecting means 60, so that the robot can be operated on the basis of operation commands outputted from the connected operation commanding means. Therefore, it is possible to minimize the system space and the system cost, because only the minimum number of the operation commanding means is provided.

What is claimed is:

1. A sequence control system for controlling a plurality of processes in sequence, each process being achieved by actuating an actuation member in both forward and reverse directions, which comprises:
    (a) forward side executing means for executing a forward process by driving at least one actuation member in the forward direction;
    (b) forward side actuating means for determining whether said forward side executing means is ready for execution;
    (c) forward side stopping means for stopping said forward side executing means;
    (d) reverse side executing means for executing a reverse process by driving the at least one actuation member in the reverse direction;
    (e) reverse side actuating means for determining whether said reverse side executing means is ready for execution;
    (f) reverse side stopping means for stopping said reverse side executing means;
    (g) actuation start side activating means, coupled to said forward side actuating means and said reverse side stopping means and activated when said reverse side stopping means is turned on, for allowing said forward side executing means to be ready for execution when said forward side actuating means is turned on;
    (h) actuation end side activating means, coupled to said forward side stopping means and said reverse side actuating means and activated when said forward side stopping means is turned on, for allowing said reverse side executing means to be ready for execution when said reverse side actuating means is turned on, said actuation start side activating means for the present process and said actuation end side activating means for the preceding process being activated simultaneously when one of said actuation start side activating means for the present process and said actuation end side activating means for the preceding process is activated; and
    (i) execution condition recognizing means, coupled to said forward side actuating means and said reverse side actuating means, for recognizing a forward side executable condition under which said forward side execution means can be executed when said forward side actuating means determines that said forward side executing means is ready for execution and a reverse side executable condition under which said reverse side execution means can be executed when said reverse side actuating means determines that said reverse side executing means is ready for execution.

2. The sequence control system of claim 1, which comprises;
    (a) a sequencer (20) for controlling a plurality of robots provided with respective connecting means, including:
        (1) input/output means, connected to a plurality of robots and robot connecting means respectively, for inputting/outputting robot motion information signals to/from the robot;

(2) control means, connected to said input/output means, for controlling an entire operation of the system;

(3) port address setting means, connected to said control means, for setting a port address setting signal;

(4) a plurality of communication enabling means, connected to said control means, said port address setting means, and the robot connecting means, for enabling communication between the connecting means and said control means; and (b) single operation commanding means selectively connected to one of the connecting means (60) of the plural robots, when said single operation commanding means is connected to one of the connecting means, wherein said control means recognizes the connecting means of the robot, to which said single operation commanding means is connected, via said input/output means, outputting a port address setting signal from said control means to said operation commanding means via said input/output means to enable communication between said control means and said operation commanding means, and also to enable said port address setting means to determine a communication port (50a) in said communication enabling means (50), so that said single operation commanding means (40) connected to the robot connecting means can input operation command signals to said sequencer via said input/output means and said communication enabling means.

3. A sequence control method, comprising the steps of:

(a) checking whether actuation start side activating means for the present process is activated;

(b) if the actuation start side activating means for the present process is activated, activating actuation end side activating means for the preceding process;

(c) checking again whether the actuation start side activating means for the present process is activated;

(d) if the actuation start side activating means for the present process is not activated, ending a program loop control;

(e) if the actuation start side activating means for the present process is activated, checking whether forward side executing means is ready for execution;

(f) if the forward side executing means is not ready for execution, repeating the above steps (c) to (e);

(g) if the forward side executing means is ready for execution, deactivating actuation end side activating means for the preceding process;

(h) deactivating the actuation start side activating means for the present process;

(i) checking whether an execution condition under which forward side executing means can be executed is recognized;

(j) if an execution condition is recognized, executing forward side executing means;

(k) if an execution condition is not recognized or the forward side executing means is executed, checking whether the forward side executing means can be stopped;

(l) if the forward side executing means cannot be stopped, repeating the above steps (i) to (k); and (m) if the forward side executing means can be stopped, activating actuation end side activating means for the present process and actuation start side activating means (P3) for the succeeding process, simultaneously.

4. The sequence control method of claim 3, which further comprises the steps of:

(a) checking whether the actuation end side activating means for the present process is activated;

(b) if the actuation end side activating means is activated, activating the actuation start side activating means for the succeeding process;

(c) checking again whether the actuation end side activating means for the present process is activated;

(d) if the actuation end side activating means is not activated, ending a program loop control;

(e) if the actuation end side activating means is activated, checking whether the reverse side executing means is ready for execution;

(f) if the reverse side executing means is not ready for execution, repeating the above steps (a) to (e);

(g) if the reverse side executing means is ready for execution, deactivating the actuation start side activating means for the succeeding process;

(h) deactivating the actuation end side activating means for the present process;

(i) checking whether an execution condition under which the reverse side executing means can be executed is recognized;

(j) if an execution condition is recognized, executing the reverse side executing means;

(k) if an execution condition is not recognized or the reverse side executing means is executed:

(l) checking whether the reverse side executing mean can be stopped;

(m) if the reverse side executing means cannot be stopped, repeating the above steps (i) to (k); and (n) if the reverse side executing means can be stopped, activating the actuation start side activating means for the present process and the actuation end side activating means for the preceding process, simultaneously.

* * * * *